(12) United States Patent
Lin et al.

(10) Patent No.: US 9,348,122 B2
(45) Date of Patent: May 24, 2016

(54) PROJECTION LENS INCLUDING FIRST LENS GROUP AND SECOND LENS GROUP AND PROJECTION DEVICE INCLUDING PLANAR REFLECTOR

(71) Applicants: Hsin-Hung Lin, Hsinchu (TW);
Yi-Hsueh Chen, Hsinchu (TW);
Chao-Shun Chen, Hsinchu (TW)

(72) Inventors: Hsin-Hung Lin, Hsinchu (TW);
Yi-Hsueh Chen, Hsinchu (TW);
Chao-Shun Chen, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 764 days.

(21) Appl. No.: 13/649,113

(22) Filed: Oct. 11, 2012

(65) Prior Publication Data

US 2013/0229635 A1   Sep. 5, 2013

(30) Foreign Application Priority Data

Mar. 2, 2012   (CN) ............... 2012 1 0052795

(51) Int. Cl.
| | | |
|---|---|---|
| *G03B 21/28* | (2006.01) | |
| *G02B 13/18* | (2006.01) | |
| *G02B 13/16* | (2006.01) | |
| *G02B 17/08* | (2006.01) | |
| *G03B 21/14* | (2006.01) | |
| *G02B 9/64* | (2006.01) | |

(52) U.S. Cl.
CPC ............ *G02B 13/18* (2013.01); *G02B 13/16* (2013.01); *G02B 17/08* (2013.01); *G02B 9/64* (2013.01); *G03B 21/147* (2013.01); *G03B 21/28* (2013.01)

(58) Field of Classification Search
CPC .......... G02B 13/18; G02B 13/16; G02B 9/64; G02B 17/08; G03B 21/147; G03B 21/28
See application file for complete search history.

(56) References Cited

U.S. PATENT DOCUMENTS

| | | | |
|---|---|---|---|
| 4,427,274 A | 1/1984 | Pund et al. | |
| 5,477,394 A | 12/1995 | Shibazaki | |
| 5,495,306 A | 2/1996 | Shibazaki | |
| 6,061,180 A * | 5/2000 | Hayakawa | 359/557 |
| 6,542,316 B2 | 4/2003 | Yoneyama | |
| 6,631,994 B2 | 10/2003 | Suzuki et al. | |

(Continued)

FOREIGN PATENT DOCUMENTS

| | | |
|---|---|---|
| CN | 101114049 | 1/2008 |
| CN | 101556424 | 10/2009 |

(Continued)

OTHER PUBLICATIONS

"Office Action of German Counterpart Application", issued on Dec. 18, 2013, p. 1-p. 5.

(Continued)

*Primary Examiner* — Bao-Luan Le
(74) *Attorney, Agent, or Firm* — Jianq Chyun IP Office

(57) ABSTRACT

A projection lens provided is for projecting an image beam. The projection lens is disposed on a transmission path of the image beam and includes a first group of lenses and a second group of lenses. The first group of lenses includes a first spherical lens and a first aspheric lens. After the image beam passes through the first group of lenses, an intermediate image is formed between the first group of lenses and the second group of lenses, in which the first aspheric lens is the lens in the first group of lenses closest to the second group of lenses. A projection device using the projection lens is also provided. The projection device further includes a planar reflector on the transmission path of the image beam.

24 Claims, 8 Drawing Sheets

(56) References Cited

U.S. PATENT DOCUMENTS

| | | | |
|---|---|---|---|
| 6,690,517 B2 | 2/2004 | Ohzawa et al. | |
| 6,804,055 B2* | 10/2004 | Peterson et al. | 359/457 |
| 6,896,375 B2* | 5/2005 | Peterson et al. | 353/66 |
| 6,984,044 B2 | 1/2006 | Kurioka et al. | |
| 6,989,936 B2 | 1/2006 | Hatakeyama | |
| 6,994,442 B2 | 2/2006 | Kurematsu et al. | |
| 7,009,765 B2* | 3/2006 | Gohman | 359/434 |
| 7,140,735 B2* | 11/2006 | Peterson et al. | 353/69 |
| 7,150,537 B2 | 12/2006 | Peterson et al. | |
| 7,341,353 B2* | 3/2008 | Peterson et al. | 353/52 |
| 7,448,756 B2* | 11/2008 | Cho et al. | 353/37 |
| 7,545,586 B2* | 6/2009 | Gohman | 359/749 |
| 7,567,380 B2* | 7/2009 | Peterson et al. | 359/449 |
| 8,081,377 B2* | 12/2011 | Gohman | 359/363 |
| 2004/0032570 A1* | 2/2004 | Peterson et al. | 353/66 |
| 2004/0032653 A1* | 2/2004 | Gohman | 359/434 |
| 2004/0047037 A1* | 3/2004 | Peterson et al. | 359/457 |
| 2004/0141157 A1 | 7/2004 | Ramachandran et al. | |
| 2004/0227990 A1* | 11/2004 | Peterson et al. | 359/457 |
| 2004/0233394 A1 | 11/2004 | Gohman | |
| 2005/0001990 A1* | 1/2005 | Peterson et al. | 353/66 |
| 2005/0275811 A1* | 12/2005 | Peterson et al. | 353/77 |
| 2006/0012755 A1 | 1/2006 | Ikeda et al. | |
| 2006/0066760 A1* | 3/2006 | Cho et al. | 348/744 |
| 2008/0130106 A1* | 6/2008 | Gohman | 359/434 |
| 2009/0244701 A1* | 10/2009 | Gohman | 359/434 |
| 2010/0171937 A1 | 7/2010 | Hirata et al. | |
| 2010/0172022 A1 | 7/2010 | Lin et al. | |
| 2010/0290010 A1 | 11/2010 | Hirata et al. | |
| 2011/0002051 A1 | 1/2011 | Hsu et al. | |

FOREIGN PATENT DOCUMENTS

| | | |
|---|---|---|
| CN | 101833166 | 9/2010 |
| CN | 201876597 | 6/2011 |
| EP | 1865374 | 12/2010 |

OTHER PUBLICATIONS

"Office Action of China Counterpart Application", issued on Nov. 15, 2014, p. 1-p. 13.

* cited by examiner

PROJECTION LENS INCLUDING FIRST LENS GROUP AND SECOND LENS GROUP AND PROJECTION DEVICE INCLUDING PLANAR REFLECTOR

CROSS-REFERENCE TO RELATED APPLICATION

This application claims the priority benefit of China application serial no. 201210052795.1, filed on Mar. 2, 2012. The entirety of the above-mentioned patent application is hereby incorporated by reference herein and made a part of this specification.

BACKGROUND OF THE INVENTION

1. Field of the Invention

The invention generally relates to an optical device, and more particularly, to a projection lens with high imaging quality and a projection device using the projection lens.

2. Description of Related Art

Among many types of display devices, the projection device features a smaller device volume but producing a large-size image frame with an area several times of the surface area thereof, so that the projection device in the display field has un-replaced advantage. The projection device projects an image beam converted by a light valve through a projection lens onto a screen. Therefore, the quality of the image frame is largely affected by the quality of the projection lens. In this regard, the projection lens is a crucial optical component in the projection device.

In general speaking, the wide-angle projection lens is able to shorten the distance between the screen and the projector device, and at the same time to get the large-size image. However, the wide-angle projection lens known in the art will produce a variety of aberrations such as distortion or field curvature, and makes the quality of the image projected by the projection device poor.

In the known art, a variety of methods to improve the imaging quality of the wide-angle projection lens are disclosed. U.S. Patent Application No. US20040233394 discloses a scheme that a reflector is added into the projection lens to shorten focal length and reduce the aberration. U.S. Pat. No. 7,009,765 uses a secondary imaging principle to produce an intermediate image, thereby reduce the aberration problem. U.S. Pat. Nos. 5,477,394, 6,994,442, 6,989,936, 6,690,517 and 6,984,044 disclose a scheme that by using a plurality of reflectors to shorten the projection distance. U.S. Patent Application No. US20110002051A1 uses two aspheric lenses and a curved-surface reflector to correct the aberration. U.S. Pat. Nos. 6,896,375, 7,341,353, 7,545,586 and 7,567,380 use multiple reflectors to shorten the focal length. U.S. Pat. No. 7,150,537 and U.S. Patent Application No. US20100172022A1 use positive-negative distortions complementary principle of two groups of lenses to correct the aberration. U.S. Pat. Nos. 4,427,274 and 5,495,306 propose a projection lens. U.S. Pat. No. 8,081,377 discloses a projection lens with an intermediate image. U.S. Patent Application No. US20100171937 discloses an optical system used in a projection-type display device. U.S. Pat. No. 6,542,316 discloses a wide-angle projection lens.

SUMMARY OF THE INVENTION

Accordingly, the invention is directed to a projection lens with high imaging quality.

The invention is also directed to a projection device with high imaging quality by using the above-mentioned projection lens.

Other objectives and advantages of the invention should be further indicated by the disclosures of the invention, and omitted herein for simplicity.

To achieve one of, a part of or all of the above-mentioned advantages, or to achieve other advantages, an embodiment of the invention provides a projection lens. The projection lens is configured for projecting an image beam. The image beam is formed through converting an illumination beam irradiated on a light valve by the light valve. The projection lens is disposed on a transmission path of the image beam and includes a first lens group and a second lens group. The first lens group includes a first spherical lens and a first aspheric lens, in which the first lens group is located between the light valve and the second lens group. The image beam passes through the first lens group to form an intermediate image. The second lens group includes a second spherical lens and a second aspheric lens. The first aspheric lens is closest to the second group of lenses in the first lens group. The intermediate image is formed between the first aspheric lens and the second lens group.

Another embodiment of the invention provides a projection device, which includes an illumination unit capable of providing an illumination beam, a light valve disposed on a transmission path of the illumination beam, an above-mentioned projection lens and a planar reflector. The light valve is configured for converting the illumination beam into an image beam. The planar reflector is disposed on a transmission path of the image beam. The second lens group is located between the first lens group and the planar reflector, and the planar reflector is configured for reflecting the image beam from the second lens group.

In an embodiment of the invention, the above-mentioned projection lens has an optical axis, the height of the light valve on the direction perpendicular to the optical axis is A, the shortest distance along the direction perpendicular to the optical axis between the light valve and the optical axis is B, and A and B are subject to following condition expression:

$$\frac{(A+B)}{A} \geq 1$$

In an embodiment of the invention, the above-mentioned intermediate image is a pincushion-like light spot or a light spot with distortion less than 1.5%.

In an embodiment of the invention, the above-mentioned first lens group further includes a third spherical lens located between the first spherical lens and the first aspheric lens, and the first spherical lens and the third spherical lens together formed a first cemented lens.

In an embodiment of the invention, the above-mentioned first lens group further includes a fourth spherical lens and a fifth spherical lens, and the fourth spherical lens and the fifth spherical lens are sequentially arranged between the third spherical lens and the first aspheric lens and together formed a second cemented lens.

In an embodiment of the invention, the above-mentioned first lens group further includes a sixth spherical lens, a seventh spherical lens and an eighth spherical lens, in which the sixth spherical lens, the seventh spherical lens and the eighth spherical lens are sequentially arranged between the fifth spherical lens and the first aspheric lens and together formed a third cemented lens.

In an embodiment of the invention, the above-mentioned first lens group further includes a ninth spherical lens, a tenth spherical lens and an eleventh spherical lens, in which the ninth spherical lens, the tenth spherical lens and the eleventh spherical lens are sequentially arranged between the eighth spherical lens and the first aspheric lens.

In an embodiment of the invention, the refractive-powers of the first spherical lens, the third spherical lens, the fourth spherical lens, the fifth spherical lens, the sixth spherical lens, the seventh spherical lens, the eighth spherical lens, the ninth spherical lens, the tenth spherical lens, the eleventh spherical lens and the first aspheric lens are sequentially negative, positive, positive, negative, positive, negative, positive, negative, positive, positive and positive.

In an embodiment of the invention, the above-mentioned second spherical lens is located between the first lens group and the second aspheric lens.

In an embodiment of the invention, the above-mentioned second lens group further includes a third aspheric lens, a fourth aspheric lens and a twelfth spherical lens, the third aspheric lens and the fourth aspheric lens are sequentially arranged between the first lens group and the second spherical lens, and the twelfth spherical lens is disposed between the second spherical lens and the second aspheric lens.

In an embodiment of the invention, the refractive-powers of the third aspheric lens, the fourth aspheric lens, the second spherical lens, the twelfth spherical lens and the second aspheric lens are sequentially negative, positive, positive, negative and negative.

In an embodiment of the invention, the position of the first lens group of the projection lens is fixed, and the second lens group is moveable along the optical axis relatively to the first lens group for focusing.

In an embodiment of the invention, the above-mentioned projection device further includes a screen for receiving the image beam passing through the second lens group and reflected by the planar reflector.

In an embodiment of the invention, the above-mentioned projection lens has an optical axis, the shortest distance along the extension direction of the optical axis between the planar reflector and the screen is C, the width of the screen on a first direction is D, in which the first direction is perpendicular to the extension direction of the optical axis, and C and D are subject to following condition expression: (C/D)<0.45.

Based on the description above, in the projection device and the projection lens provided by an embodiment of the invention, by using a first lens group including at least one aspheric lens and spherical lenses to form a pincushion-like light spot or an intermediate image with distortion less than 1.5% and then by using a second lens group including at least one aspheric lens and spherical lenses to correct and magnify the intermediate image, followed by transmitting the intermediate image to a planar reflector, the planar reflector is able to project the image beam onto a screen so as to form almost no distorted images.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

FIG. 6 illustrates nine light spot diagrams on the screen at nine different positions formed by the projection device of FIG. 1 a.

DESCRIPTION OF THE EMBODIMENTS

The above-mentioned or other relevant technical principles and the features and effects thereof are clearly depicted together with the accompanying drawings in the following depicted embodiments. Note that some of expression words hereinafter regarding direction or orientation, such as 'up', 'down', 'front', 'behind', 'left', 'right', and the like, are to describe, not to limit, the invention.

Figure 1A:
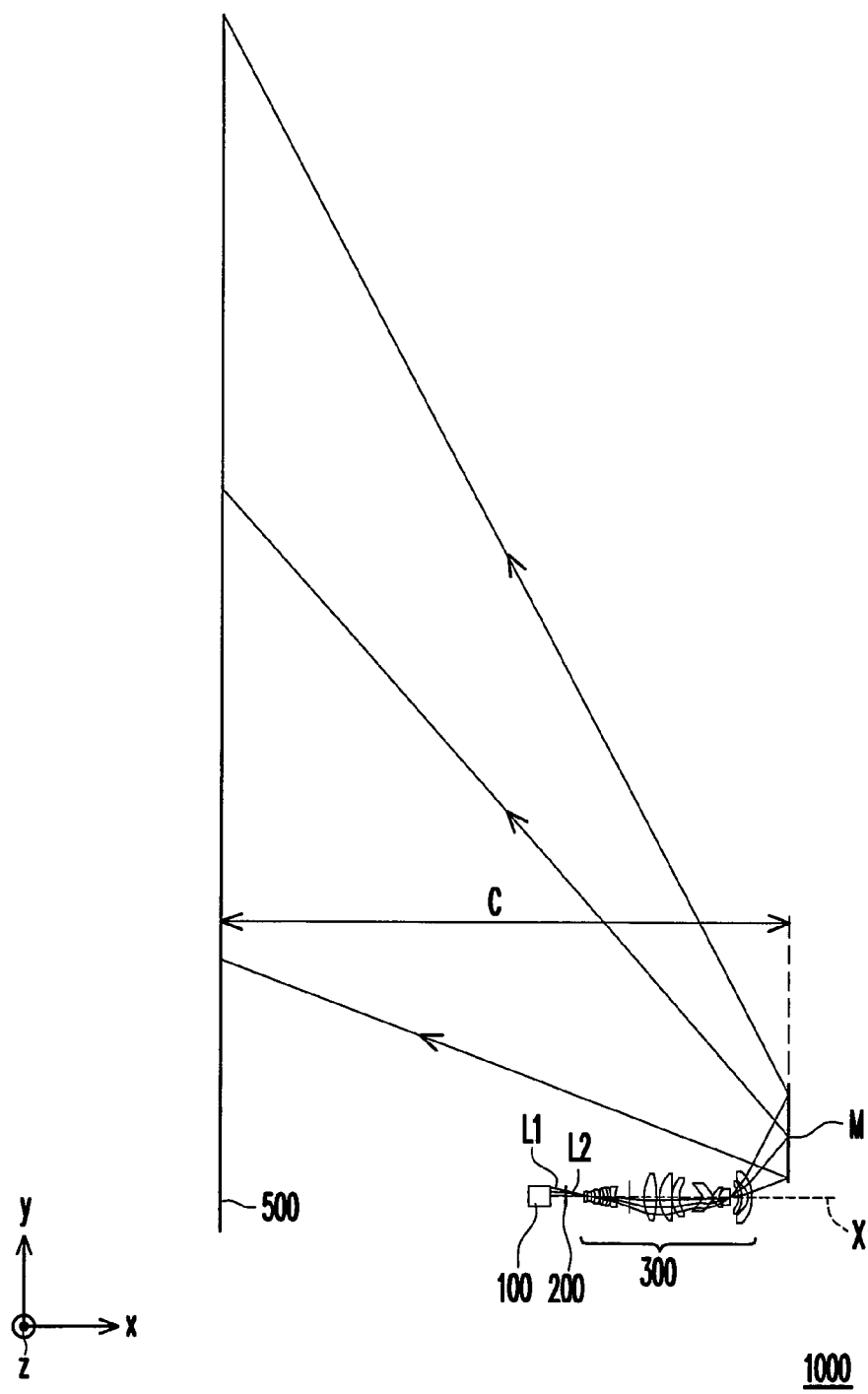
FIG. 1*a* is a schematic diagram of a projection device according to an embodiment of the invention.
Figure 2:
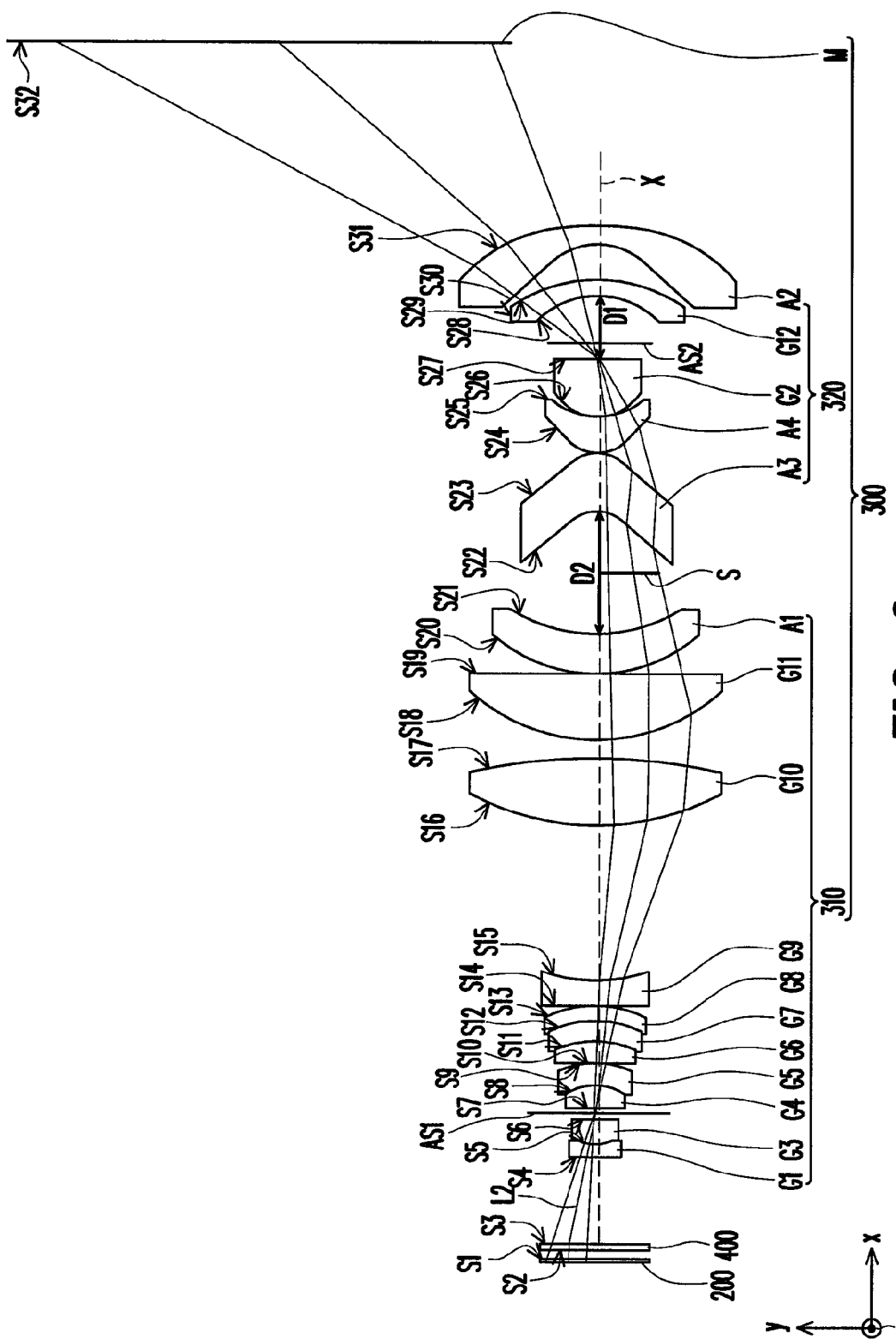
FIG. 2 is a diagram showing the light valve and the projection lens in FIG. 1*a*.

FIG. 1*a* is a schematic diagram of a projection device according to an embodiment of the invention and FIG. 2 is a diagram showing the light valve, the projection lens and planar reflector in FIG. 1*a*. Referring to FIG. 1*a*, a projection device 1000 of the embodiment includes an illumination unit 100, a light valve 200, a projection lens 300 and a planar reflector M. The illumination unit 100 is for providing an illumination beam L1. The light valve 200 is disposed on the transmission path of the illumination beam L1 to convert the illumination beam L1 into an image beam L2. The projection lens 300 and the planar reflector M are disposed on the transmission path of the image beam L2. The projection lens 300 projects the image beam L2 which comes from the light valve 200 onto the planar reflector M. In the embodiment, the light valve 200 can be digital micro-mirror device (DMD), liquid-crystal-on-silicon panel or other appropriate spatial light modulator (SLM), which the invention is not limited to.

Figure 3:
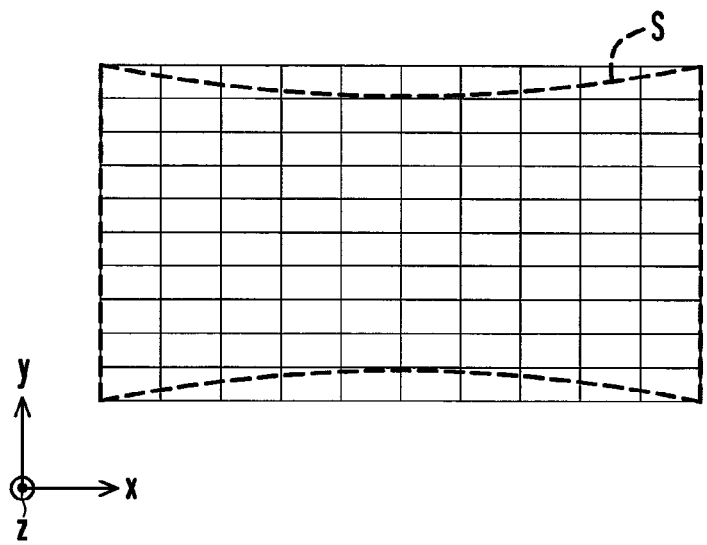
FIG. 3 illustrates the shape of the intermediate image of FIG. 1*a*.

Referring to FIG. 2, the projection lens 300 of the embodiment includes a first lens group 310 and a second lens group 320, in which the second lens group 320 is located between the first lens group 310 and the planar reflector M. In the embodiment, the image beam L2 passes through the first lens group 310 to form an intermediate image S, the second lens group 320 magnifies the intermediate image S and transmits the intermediate image S onto the planar reflector M, and the planar reflector M reflects the image beam L2 onto a screen 500 (shown in FIG. 1) to form almost no distorted images. In more details, in the embodiment, the image beam L2 passes through the first lens group 310 and then forms the intermediate image S. FIG. 3 illustrates the shape of the intermediate image of FIG. 1. Referring to FIG. 3, in the embodiment, the intermediate image S can be a pincushion-like light spot. After the intermediate image S is compensated by the second lens group 320, a primitively-magnified image is formed on the planar reflector M. Then, the image formed on the planar reflector M is reflected by the planar reflector M onto the screen 500 so as to form an almost no distorted image with good quality. In the embodiment, the distortion of the pincushion-like light spot (including lateral distortion and longitudinal distortion) can be less than 10%.

Figure 4:
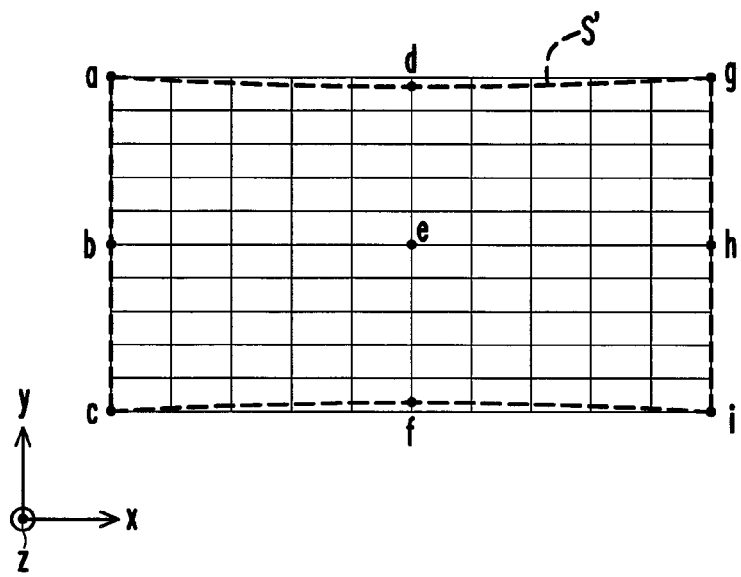
FIG. 4 is a schematic diagram of an intermediate image according to another embodiment of the invention.

However, the shape of the intermediate image S of the invention is not limited to the pincushion-like light spot. In other embodiments, the intermediate image S can be also an almost no distorted light spot (the distortion thereof is less than 1.5%). In following, the definition of the distortion is explained in association with FIG. 4. FIG. 4 is a schematic diagram of an intermediate image according to another embodiment of the invention. Referring to FIG. 4, the intermediate image S' has a center point e and four vertices a, g, i and c. The two connection-lines between a and g and between c and i are two opposite sides of the intermediate image S' in x direction $\overline{ag}$ and $\overline{ci}$. The two connection-lines between a and c and between g and i are two opposite sides of the intermediate image S' in y direction $\overline{ac}$ and $\overline{gi}$. In addition, the intermediate image S' has also two vertices d and f, which are respectively located on the two sides $\overline{ag}$ and $\overline{ci}$ and aligned to e on the y direction. The intermediate image S' has also two vertices b and h, which are respectively located on the two sides $\overline{ac}$ and $\overline{gi}$ and aligned to e on the z direction. The lateral distortion of the intermediate image S' is expressed as $[(\overline{ag}+\overline{ci}-2bh)/(2bh)] \times 100\%$; the longitudinal distortion of the intermediate image S' is expressed as $[(\overline{gi}-\overline{df})/(\overline{df})] \times 100\%$. In the embodiment of FIG. 3, the lateral distortion and the longitudinal distortion of the intermediate image S are both less than 1.5%.

The structure of the projection lens in an embodiment of the invention can be understood in FIG. 2. Referring to FIG. 2, the first lens group 310 of the embodiment includes a first spherical lens G1 and a first aspheric lens A1. After the image beam L2 passes through the first lens group 310, the intermediate image S is formed between the first lens group 310 and the second lens group 320. The first aspheric lens A1 is located between the first spherical lens G1 and the second lens group 320. In more details, the first aspheric lens A1 is closest to the second group of lenses 320 in the first lens group 310. In the embodiment, the refractive-power of the first spherical lens G1 is negative and the refractive-power of the first aspheric lens A1 is positive. The first spherical lens G1 is a convex-concave lens with its concave surface facing the second lens group 320, while the first aspheric lens A1 is a concave-convex lens with its concave surface facing the second lens group 320. In addition, the projection device of the embodiment further includes a protection cover 400 located between the light valve 200 and the projection lens 300 for protecting the light valve 200.

The first lens group 310 of the embodiment further includes a third spherical lens G3 located between the first spherical lens G1 and the first aspheric lens A1. In the embodiment, the refractive-power of the third spherical lens G3 is positive. The first spherical lens G1 and the third spherical lens G3 are together formed a first cemented lens. The first lens group 310 of the embodiment further includes a fourth spherical lens G4 and a fifth spherical lens G5. The fourth spherical lens G4 is located between the third spherical lens G3 and the first aspheric lens A1, while the fifth spherical lens G5 is located between the fourth spherical lens G4 and the first aspheric lens A1. In the embodiment, the fourth spherical lens G4 and the fifth spherical lens G5 are together formed a second cemented lens. The refractive-power of the fourth spherical lens G4 is positive and the refractive-power of the fifth spherical lens G5 is negative. The fourth spherical lens G4 is a biconvex lens, and the fifth spherical lens G5 is a concave-convex lens with its concave surface facing the light valve 200.

The first lens group 310 in the embodiment further includes a sixth spherical lens G6, a seventh spherical lens G7 and an eighth spherical lens G8. The sixth spherical lens G6, the seventh spherical lens G7 and the eighth spherical lens G8 are located between fifth spherical lens G5 and the first aspheric lens A1 and sequentially arranged from the fifth spherical lens G5 to the first aspheric lens A1. In the embodiment, the sixth spherical lens G6, the seventh spherical lens G7 and the eighth spherical lens G8 together form a third cemented lens. The refractive-powers of the sixth spherical lens G6, the seventh spherical lens G7 and the eighth spherical lens G8 are sequentially positive, negative and positive. The sixth spherical lens G6 is a double-convex lens, the seventh spherical lens G7 is a convex-concave lens with its concave -surface facing the light valve 200 and the eighth spherical lens G8 is a concave-convex lens with its concave surface facing the light valve 200.

The first lens group 310 in the embodiment further includes a ninth spherical lens G9, a tenth spherical lens G10 and an eleventh spherical lens G11. The ninth spherical lens G9 is located between the eighth spherical lens G8 and the first aspheric lens A1. In the embodiment, the refractive-power of the ninth spherical lens G9 is negative and the ninth spherical lens G9 is a convex-concave lens with its concave surface facing the second lens group. The tenth spherical lens G10 is located between the ninth spherical lens G9 and the first aspheric lens A1. In the embodiment, the refractive-power of the tenth spherical lens G10 is positive and the tenth spherical lens G10 is a biconvex lens. The eleventh spherical lens G11 is located between the tenth spherical lens G10 and the first aspheric lens A1. In the embodiment, the refractive-power of the eleventh spherical lens G11 is positive and the eleventh spherical lens G11 is a concave-convex lens with its convex surface facing the light valve 200. In addition, the projection lens 300 of the embodiment further includes an aperture Stop (A.S.) AS1 located between the third spherical lens G3 and the fourth spherical lens G4.

The second lens group 320 is disposed between the first lens group 310 and the planar reflector M. The second lens group 320 includes a second spherical lens G2 and a second aspheric lens A2. In the embodiment, the second aspheric lens A2 is located between the second spherical lens G2 and the planar reflector M. The refractive-power of the second aspheric lens A2 is negative, but the refractive-power of the second spherical lens G2 is positive. The second aspheric lens A2 is a convex-concave lens with its convex surface facing the planar reflector M and the second spherical lens G2 is a concave-convex lens with its convex surface facing the light valve 200

The second lens group 320 of the embodiment further includes a third aspheric lens A3 and a fourth aspheric lens A4. The third aspheric lens A3 is located between the first lens group 310 and the second spherical lens G2. The refractive-power of the third aspheric lens A3 is negative and the third aspheric lens A3 is a convex-concave lens with its convex surface facing the planar reflector M. The fourth aspheric lens A4 is located between the third aspheric lens A3 and the second spherical lens G2. The refractive-power of the fourth aspheric lens A4 is positive and the fourth aspheric lens A4 is a concave-convex lens with its concave surface facing the planar reflector M.

The second lens group 320 of the embodiment further includes a twelfth spherical lens G12. The twelfth spherical lens G12 is located between the second spherical lens G2 and the second aspheric lens A2. In the embodiment, the refractive-power of the twelfth spherical lens G12 is negative and the twelfth spherical lens G12 is a convex-concave lens with its concave surface facing the light valve 200. In addition, the projection lens 300 of the embodiment further includes an aperture Stop (A.S.) AS2 located between the second spherical lens G2 and the twelfth spherical lens G12.

The projection lens 300 of the embodiment has an optical axis X. The position of the first lens group 310 of the projection lens 300 is fixed, but the second lens group 320 is moveable along the optical axis X relatively to the first lens group 310 for focusing. In the embodiment, the relative positions of the third aspheric lens A3, the fourth aspheric lens A4 and the second spherical lens G2 of the second lens group 320 is fixed and the relative position of the twelfth spherical lens G12 and the second aspheric lens A2 of the second lens group 320 is fixed as well. After the projection device 1000 of the embodiment is finished, the user can adjust the relative distance D1 between the second spherical lens G2 and the twelfth spherical lens G12 so as to focus the image on the screen 500.

In the embodiment, the first aspheric lens A1 of the first lens group 310 and the second aspheric lens A2, the third aspheric lens A3 and the fourth aspheric lens A4 of the second lens group 320 are configured for correcting the aberration of the projection device 1000. On the other hand, the image beam L2 after passing through the first lens group 310 would produce an intermediate image S with a positive tangential field curvature. The intermediate image S with the positive tangential field curvature passes through the second group of lenses 320 so as to produce a negative tangential field curvature and finally to form an almost no distorted images on the screen 500. Prior to shipping out the projection device 1000 of the embodiment, the relative distance D2 of the first lens group 310 and the second lens group 320 can be adjusted by the manufacturer to compensate the fabrication tolerance of the projection lens 300.

Figure 1B:
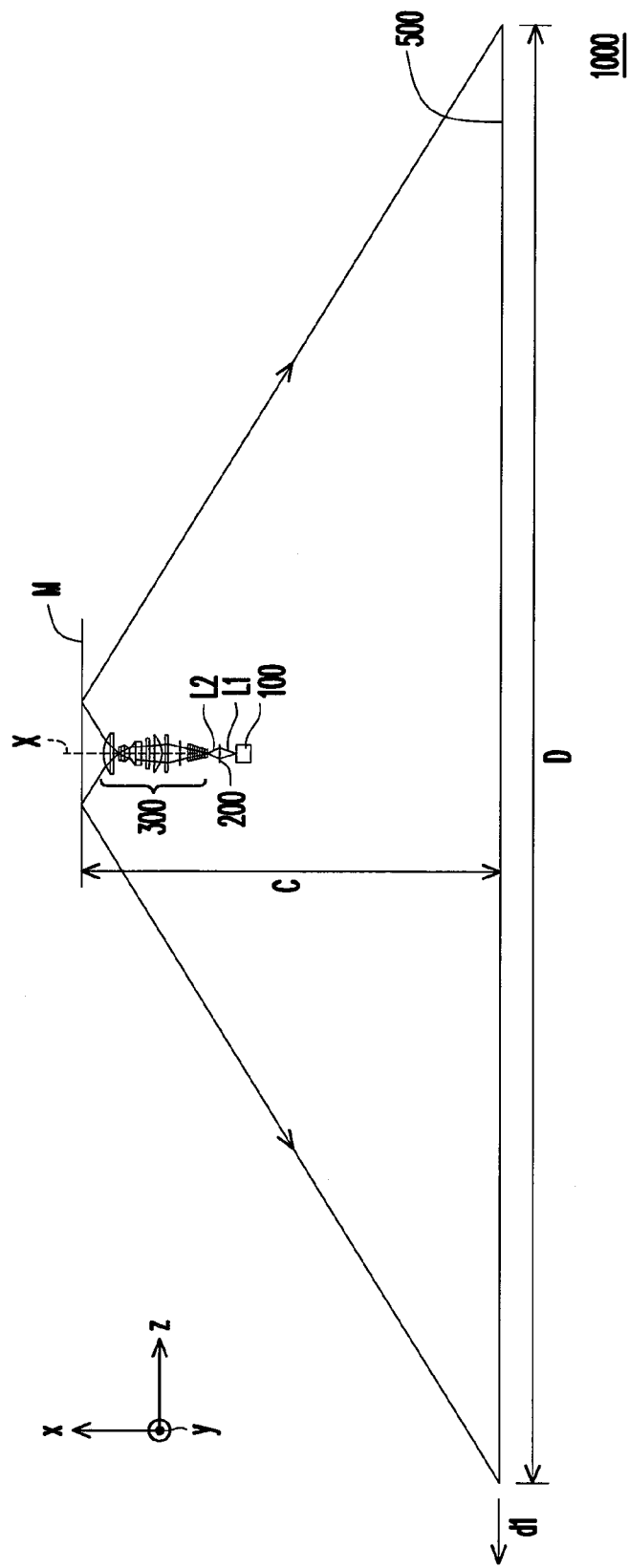
FIG. 1*b* is a top view diagram of FIG. 1*a*.

FIG. 1b is a top view diagram of FIG. 1a. Referring to FIGS. 1a, 1b and 2, the projection device 1000 of the embodiment further includes the screen 500 for receiving the image beam L2, in which the image beam L2 passes through the second lens group 320 of the projection lens 300 and is reflected by the planar reflector M. As shown by FIG. 1b, the shortest distance along the extension direction of the optical axis X between the planar reflector M and the screen 500 is C, the width of the screen 500 on the direction d1 (i.e., the z direction in FIGS. 1a and 1b) is D, and the direction d1 is perpendicular to the extension direction of the optical axis X. In the embodiment, C and D are subject to the condition expression: (C/D)<0.45. In other words, the projection device 1000 of the embodiment is capable of projecting a large-size image in a shorter distance.

Figure 5:
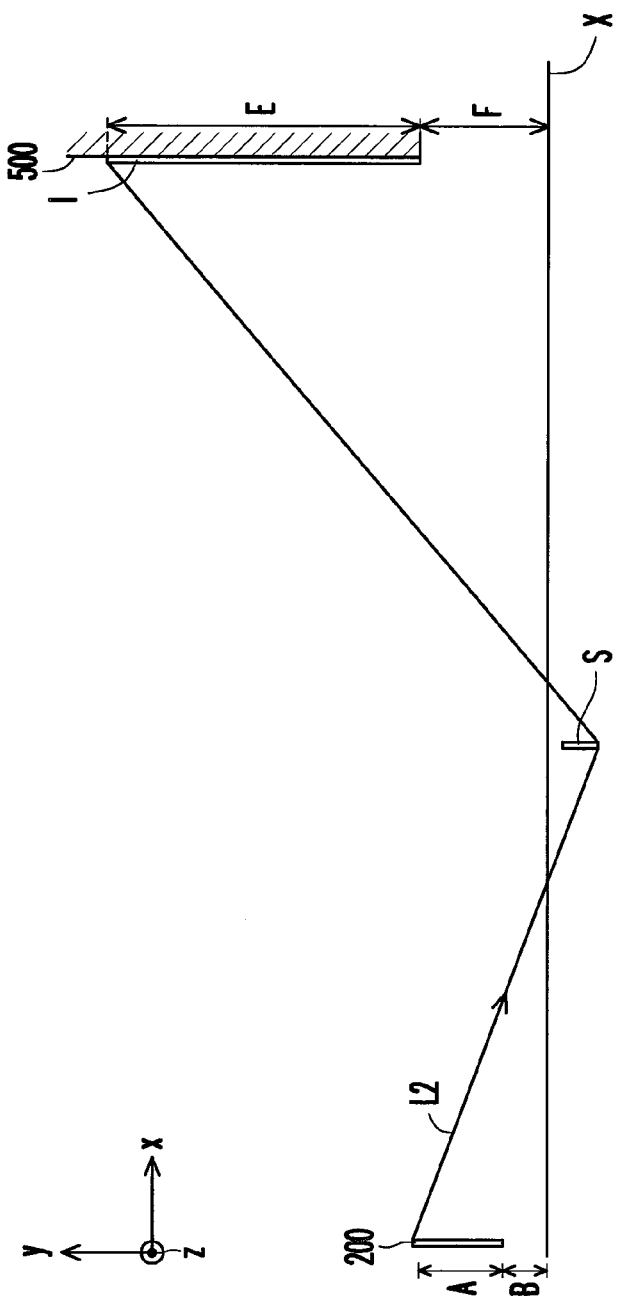
FIG. 5 is a diagram showing the light valve, the intermediate image, the screen and the optical axis in FIG. 2.

FIG. 5 is a diagram showing the light valve, the intermediate image, the screen and the optical axis in FIG. 2. Referring to FIG. 5, the height of the light valve 200 on the direction perpendicular to the optical axis X (for example, y direction) is A. The shortest distance of the light valve 200 from the optical axis X on the direction perpendicular to the optical axis X is B. In the embodiment, A and B are subject to the following condition expression:

$$\frac{(A+B)}{A} \geq 1$$

The height of the screen 500 on the direction perpendicular to the optical axis X (for example, y direction) is E and the shortest distance of the screen 500 from the optical axis X on the direction perpendicular to the optical axis X is F. In the embodiment, E and F are subject to the following condition expression:

$$\frac{(E+F)}{E} \geq 1$$

In other words, the light valve 200 of the embodiment can be completely located over the optical axis X. In more details, in the embodiment, the light valve 200 is over the optical axis X and the intermediate image S is completely formed under the optical axis X, and the intermediate image S after passing through the second lens group 320 forms an image I on the screen 500 and the image I is completely located over the optical axis X. The light valve 200 and the screen 500 are located at a side of the optical axis X and the intermediate image S is formed at another side of the optical axis X, which make the intermediate image S and the light valve 200 together with the screen 500 respectively located at the two opposite sides of the optical axis X.

In following the implementation of a projection lens is described according to an embodiment of the invention. It should be noted that the data in the following tables 1 and 2 are not to limit the invention, any people skilled in the art can refer to the invention to properly modify the parameters or the setting, which still falls in the scope of the invention.

TABLE 1

| Surface | Curvature radius (mm) | Interval (mm) | Refractive index | Abbe number | Note |
|---|---|---|---|---|---|
| S1 | infinity | 1.1 | | | light valve |
| S2 | infinity | 1.05 | 1.5069 | 63.1029 | protection cover |
| S3 | infinity | 21.495 | | | |
| S4 | 46.302428 | 2.784662 | 1.7495 | 34.82 | first spherical lens |
| S5 | 16.849674 | 5.224761 | 1.5168 | 64.1673 | third spherical lens |
| S6 | −19.249738 | 0.2 | | | |
| S7 | 255.540998 | 5.251584 | 1.487490 | 70.4058 | fourth spherical lens |
| S8 | −11.801538 | 4.142093 | 1.801070 | 34.9739 | fifth spherical lens |
| S9 | −48.596380 | 0.2 | | | |
| S10 | 76.144112 | 5.513735 | 1.487490 | 70.4058 | sixth spherical lens |
| S11 | −21.139548 | 3.635505 | 1.7495 | 34.82 | seventh spherical lens |
| S12 | −34.781823 | 3.853042 | 1.563840 | 60.7989 | eighth spherical lens |
| S13 | −23.978148 | 0.2 | | | |
| S14 | 131.307927 | 4.890748 | 1.723420 | 37.9556 | ninth spherical lens |
| S15 | 33.544687 | 35.236432 | | | |
| S16 | 81.124413 | 13.651635 | 1.723420 | 37.9556 | tenth spherical lens |
| S17 | −157.420246 | 4.111030 | | | |
| S18 | 44.600542 | 14.383750 | 1.5168 | 64.1673 | eleventh spherical lens |
| S19 | 1632.393525 | 0.2 | | | |
| S20 | 37.402427 | 8.064895 | 1.525279 | 55.9508 | first aspheric lens |
| S21 | 49.532899 | 27.998359 | | | |
| S22 | −4.729779 | 11.127453 | 1.525279 | 55.9508 | third aspheric lens |
| S23 | −10.040825 | 0.235387 | | | |
| S24 | 7.029546 | 8.535861 | 1.525279 | 55.9508 | fourth aspheric lens |
| S25 | 10.246789 | 0.2 | | | |
| S26 | 12.390128 | 12 | 1.487490 | 70.4058 | second spherical lens |
| S27 | 183.630617 | 11.390752 | | | |
| S28 | −21.486654 | 3.303004 | 1.805181 | 25.4254 | twelfth spherical lens |
| S29 | −34.511684 | 7.765541 | | | |

TABLE 1-continued

| Surface | Curvature radius (mm) | Interval (mm) | Refractive index | Abbe number | Note |
|---|---|---|---|---|---|
| S30 | −13.757502 | 3.9 | 1.491756 | 57.4408 | second aspheric lens |
| S31 | −83.489107 | 46 | | | |
| S32 | infinity | 654.83 | | | planar reflector |

In Table 1, the curvature radius is the one corresponding to the surface given out in the first column, and the interval means the distance between two adjacent surfaces on the optical axis X. For example, the interval of the surface S1 means the distance between the surface S1 and the surface S2. In the note fields, the thickness, the refractive index and the Abbe number corresponding to each of the lenses and each of the optical components marked in the note fields are given in the same row. The surface S1 is the surface of the light valve 200 facing the first group of lenses 310. The surface S2 and the surface S3 are the two surfaces of the protection cap 400 respectively facing the light valve 200 and the first group of lenses 310. The surface S4 is the surface of the first spherical lens G1 facing the light valve 200. The surface S5 is the surface of the third spherical lens G3 facing the light valve 200. The surface S6 is the surface of the third spherical lens G3 facing the second group of lenses 320. The surface S7 is the surface of the fourth spherical lens G4 facing the light valve 200. The surface S8 and the surface S9 are the two surfaces of the fifth spherical lens G5 respectively facing the light valve 200 and the second group of lenses 320. The surface S10 is the surface of the sixth spherical lens G6 facing the light valve 200. The surface S11 is the surface of the seventh spherical lens G7 facing the light valve 200. The surface S12 and the surface S13 are the two surfaces of the eighth spherical lens G8 respectively facing the light valve 200 and the second group of lenses 320. The surface S14 and the surface S15 are the two surfaces of the nth spherical lens G9 respectively facing the light valve 200 and the second group of lenses 320. The surface S16 and the surface S17 are the two surfaces of the tenth spherical lens G10 respectively facing the light valve 200 and the second group of lenses 320. The surface S18 and the surface S19 are the two surfaces of the eleventh spherical lens G11 respectively facing the light valve 200 and the second group of lenses 320. The surface S20 and the surface S21 are the two surfaces of the first aspheric lens A1 respectively facing the light valve 200 and the second group of lenses 320. The above-mentioned eleven lenses can form the first group of lenses 310.

In addition, the surface S22 and the surface S23 are the two surfaces of the of the third aspheric lens A3 respectively facing the first group of lenses 310 and the planar reflector M.

The surface S26 and the surface S27 are the two surfaces of the second spherical lens G2 respectively facing the first group of lenses 310 and the planar reflector M. The surface S28 and the surface S29 are the two surfaces of the twelfth spherical lens G12 respectively facing the first group of lenses 310 and the planar reflector M. The surface S30 and the surface S31 are the two surfaces of the second aspheric lens A2 respectively facing the first group of lenses 310 and the planar reflector M. The surface S32 is the reflective surface of the planar reflector M. The above-mentioned eight lenses can form the second group of lenses 320. The parameters such as the curvature radius and the interval can refer to Table 1, which are omitted to describe.

It should be noted that the above-mentioned surfaces S20-S25, S30 and S31 are aspheric surfaces and the aspheric surface can be expressed by the following formula:

$$Z = \frac{cr^2}{1 + \sqrt{1 - (1+k)c^2r^2}} + Ar^4 + Br^6 + Cr^8 + Dr^{10} + Er^{12} + Fr^{14} + Gr^{16} + \ldots$$

In the above-mentioned formula, Z is sag of the aspheric surface on the direction of the optical axis, c is reciprocal of the radius of the osculating spherical surface (i.e., c is reciprocal of the curvature radius at the place close to the optical axis X), k is the coefficient of the conic curved-surface, r is the height of the aspheric surface (i.e., the height from the lens center to the lens edge), and A-G are the aspheric coefficients. The parameters of the surfaces S20-S25, S30 and S31 are listed in Table 2.

TABLE 2

| | c | A | B | C | D | E | F | G |
|---|---|---|---|---|---|---|---|---|
| S20 | 0.603367 | 3.1044E−6 | −3.096E−9 | −1.349E−11 | 1.7965E−15 | −1.827E−17 | 3.1971E−20 | |
| S21 | 3.751516 | 7.0385E−6 | −3.372E−9 | −2.067E−11 | −1.895E−13 | 5.0396E−16 | −3.961E−19 | |
| S22 | −3.208106 | −1.439E−4 | 1.1061E−6 | −5.182E−9 | 1.4034E−11 | −1.505E−14 | −9.880E−18 | 2.5134E−20 |
| S23 | −3.091746 | −1.160E−4 | 6.7682E−7 | −2.519E−9 | 6.0638E−12 | −8.028E−15 | 4.3174E−18 | |
| S24 | −1.649854 | 1.5768E−4 | −3.443E−7 | −3.005E−9 | 2.2990E−11 | −1.691E−13 | 5.0467E−16 | |
| S25 | −11.362718 | 3.4326E−4 | −6.439E−6 | 8.3132E−8 | −6.834E−10 | 3.114E−12 | −5.873E−15 | |
| S30 | −0.912538 | 2.1223E−5 | 4.985E−9 | 2.2464E−13 | −5.703E−15 | | | |
| S31 | −4.362018 | −4.335E−6 | −3.660E−9 | 4.2779E−12 | −2.681E−15 | | | |

Figure 6:
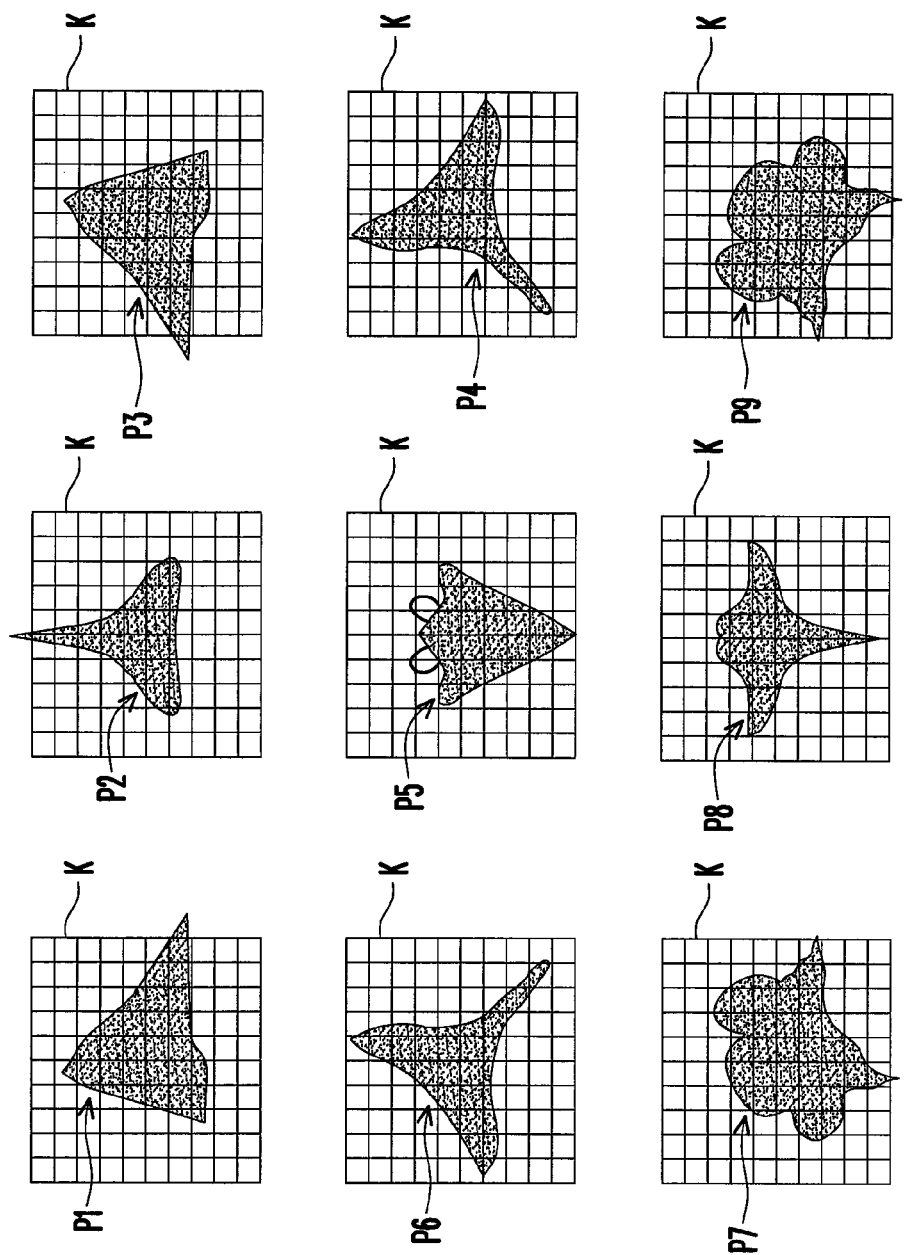
Figure 7:
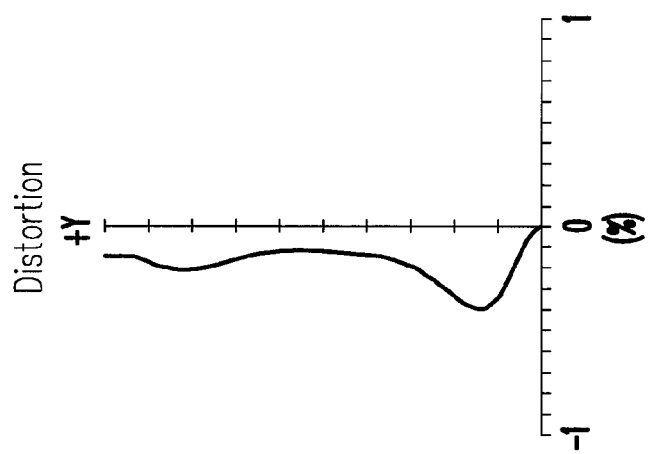
FIG. 7 is a plot showing the optical distortions of the projection device of FIG. 1*a*.
Figure 8:
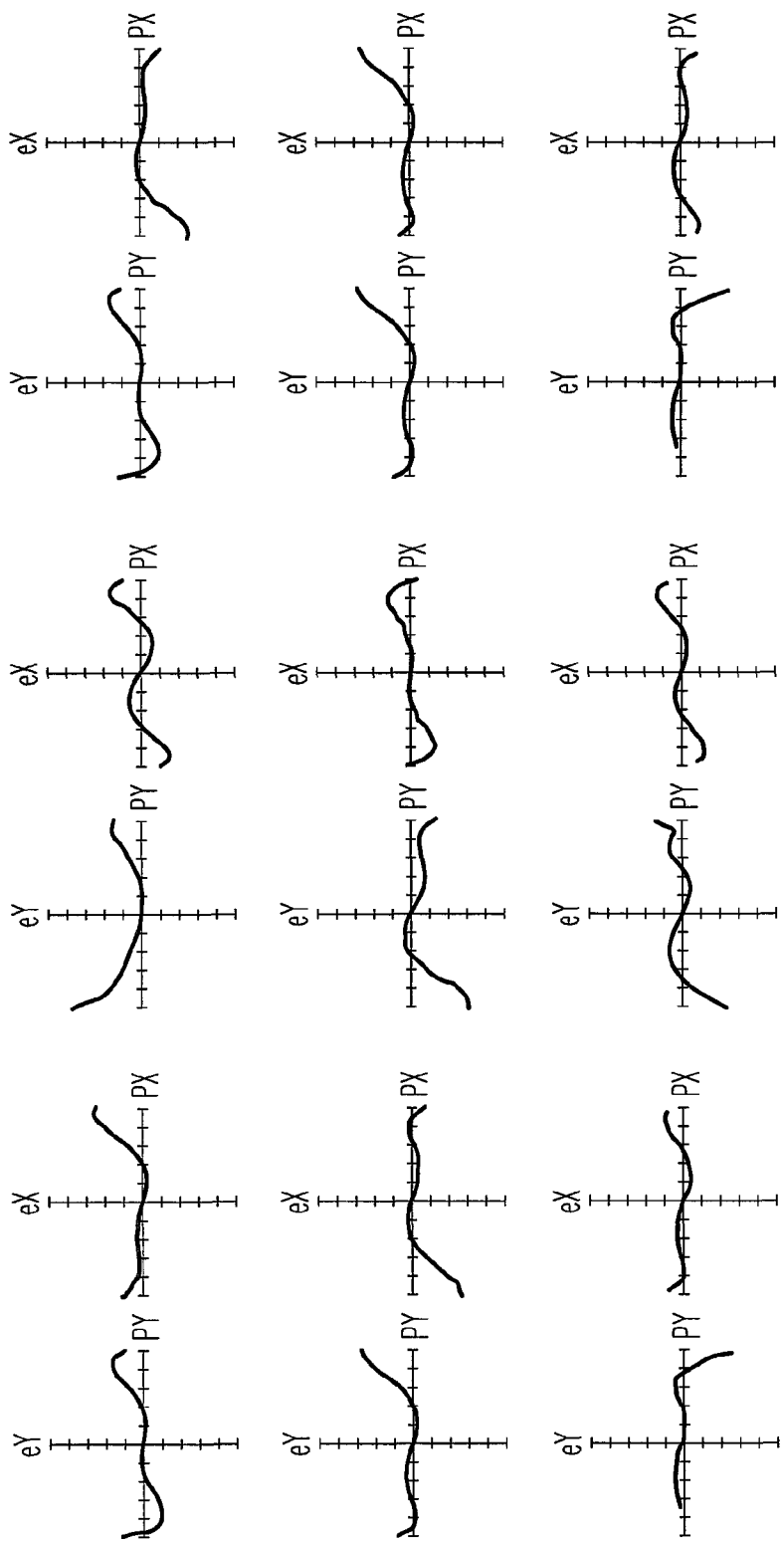
FIG. 8 is a diagram showing transverse ray fan plots of the projection device of FIG. 1*a*.

FIG. 6 illustrates nine light spot diagrams on the screen at nine different positions formed by the projection device of FIG. 1a. The size of each frame in FIG. 6 represents the dimension of two pixels. It can be seen from FIG. 6, for the nine imaging points P1-P9 with different positions on the screen, all the dimensions thereof can be less than the size of the two pixels. In other words, the sharpness of the projected image come from the projection device of the embodiment is quite high. FIG. 7 is a plot showing the optical distortions of the projection device of FIG. 1a and FIG. 8 is a diagram showing transverse ray fan plots of the projection device of FIG. 1a. The plots of FIGS. 7 and 8 are within the standard range, and therefore, the projection device 1000 of the embodiment can achieve good imaging effect.

In summary, in the projection device and the projection lens provided by an embodiment of the invention, by using the first lens group including at least one aspheric lens and spherical lenses to form an intermediate image and then by using a second lens group including at least one aspheric lens and spherical lenses to magnify the intermediate image, followed by projecting the intermediate image to a planar reflector, and then the reflector projects the image onto a screen so as to form almost no distorted images with good quality on the screen. In short, the projection lens of an embodiment of the invention can shorten the distance between the screen to the projector device, and at the same time to get the large-size image on the screen.

It will be apparent to those skilled in the art that various modifications and variations can be made to the structure of the invention without departing from the scope or spirit of the invention. In view of the foregoing, it is intended that the invention covers modifications and variations of this invention provided they fall within the scope of the following claims and their equivalents. In addition, any one of the embodiments or claims of the invention is not necessarily achieve all of the above-mentioned objectives, advantages or features. The abstract and the title herein are used to assist searching the documentations of the relevant patents, not to limit the claim scope of the invention. The ordinal numbers prior to some elements, such as first, second and the like, for example, the first group of lenses or the second group of lenses are used to represent the names of the elements only, not to restricts the upper limit or lower limit of the quantity of the elements.

What is claimed is:

1. A projection lens, comprising:
   a first lens group, comprising a first spherical lens and a first aspheric lens, wherein an image beam is formed by a light valve passes through the first lens group to form an intermediate image with a first tangential field curvature; and
   a second lens group, comprising a second spherical lens, a second aspheric lens, a third aspheric lens, a fourth aspheric lens and a twelfth spherical lens;
   wherein refractive-powers of the third aspheric lens, the fourth aspheric lens, the second spherical lens, the twelfth spherical lens and the second aspheric lens are sequentially negative, positive, positive, negative and negative,
   wherein the first lens group is located between the light valve and the second lens group, and a lens in the first lens group closest to the second lens group is the first aspheric lens and the intermediate image is formed between the first aspheric lens and the second lens group, wherein the intermediate image with the first tangential field curvature passes through the second lens group to produce a second tangential field curvature, and one of the first tangential field curvature and the second tangential field curvature is a positive tangential field curvature while the other one is a negative tangential field curvature.

2. The projection lens as claimed in claim 1, wherein the projection lens has an optical axis, a height of the light valve on a direction perpendicular to the optical axis is A, a shortest distance along the direction perpendicular to the optical axis between the light valve and the optical axis is B, and A and B are subject to following condition expression:

$$\frac{(A+B)}{A} \geq 1.$$

3. The projection lens as claimed in claim 1, wherein the intermediate image is a pincushion-like light spot or a light spot with distortion less than 1.5%.

4. The projection lens as claimed in claim 1, wherein the first lens group further comprises a third spherical lens located between the first spherical lens and the first aspheric lens, and the first spherical lens and the third spherical lens together formed a first cemented lens.

5. The projection lens as claimed in claim 4, wherein the first lens group further comprises a fourth spherical lens and a fifth spherical lens, and the fourth spherical lens and the fifth spherical lens are sequentially arranged between the third spherical lens and the first aspheric lens and together formed a second cemented lens.

6. The projection lens as claimed in claim 5, wherein the first lens group further comprises a sixth spherical lens, a seventh spherical lens and an eighth spherical lens, wherein the sixth spherical lens, the seventh spherical lens and the eighth spherical lens are sequentially arranged between the fifth spherical lens and the first aspheric lens and together formed a third cemented lens.

7. The projection lens as claimed in claim 6, wherein the first lens group further comprises a ninth spherical lens, a tenth spherical lens and an eleventh spherical lens, wherein the ninth spherical lens, the tenth spherical lens and the eleventh spherical lens are sequentially arranged between the eighth spherical lens and the first aspheric lens.

8. The projection lens as claimed in claim 7, wherein refractive-powers of the first spherical lens, the third spherical lens, the fourth spherical lens, the fifth spherical lens, the sixth spherical lens, the seventh spherical lens, the eighth spherical lens, the ninth spherical lens, the tenth spherical lens, the eleventh spherical lens and the first aspheric lens are sequentially negative, positive, positive, negative, positive, negative, positive, negative, positive, positive and positive.

9. The projection lens as claimed in claim 1, wherein the second spherical lens is located between the first lens group and the second aspheric lens.

10. The projection lens as claimed in claim 1, wherein the third aspheric lens and the fourth aspheric lens are sequentially arranged between the first lens group and the second spherical lens, and the twelfth spherical lens is disposed between the second spherical lens and the second aspheric lens.

11. The projection lens as claimed in claim 2, wherein a position of the first lens group is fixed, and the second lens group is moveable along the optical axis relatively to the first lens group for focusing.

12. A projection device, comprising:
    an illumination unit, capable of providing an illumination beam;
    a light valve, disposed on transmission path of the illumination beam to convert the illumination beam into an image beam; and
    a projection lens, disposed on a transmission path of the image beam and comprising:
       a first lens group, comprising a first spherical lens and a first aspheric lens, wherein the image beam passes through the first lens group to form an intermediate image with a first tangential field curvature;
       a second lens group, comprising a second spherical lens, a second aspheric lens, a third aspheric lens, a fourth aspheric lens and a twelfth spherical lens; wherein refractive-powers of the third aspheric lens, the fourth aspheric lens, the second spherical lens, the twelfth spherical lens and the second aspheric lens are sequentially negative, positive, positive, negative and negative, wherein the first lens group is located between the light valve and the second lens group, a lens in the first lens group closest to the second lens group is the first aspheric lens and the intermediate image is formed between the first aspheric lens and the second lens group, wherein the intermediate image with the first tangential field curvature passes through the second lens group to produce a second tangential field curvature, and one of the first tangential field curvature and the second tangential field curvature is a positive tangential field curvature while the other one is a negative tangential field curvature; and a planar reflector, disposed on the transmission path of the image beam, wherein the second lens group is located between the first lens group and the planar reflector, and the planar reflector is configured for reflecting the image beam from the second lens group.

13. The projection device as claimed in claim 12, further comprises a screen for receiving the image beam passing through the second lens group and reflected by the planar reflector.

14. The projection device as claimed in claim 13, wherein the projection lens has an optical axis, a shortest distance along an extension direction of the optical axis between the planar reflector and the screen is C, a width of the screen on a first direction is D, the first direction is perpendicular to the extension direction of the optical axis, and C and D are subject to following condition expression:

$(C/D)<0.45.$

15. The projection device as claimed in claim 14, wherein a height of the light valve on a direction perpendicular to the optical axis is A, a shortest distance along the direction perpendicular to the optical axis between the light valve and the optical axis is B, and A and B are subject to following condition expression:

$$\frac{(A+B)}{A} \geq 1.$$

16. The projection device as claimed in claim 12, wherein the intermediate image is a pincushion-like light spot or a light spot with distortion less than 1.5%.

17. The projection device as claimed in claim 12, wherein the first lens group further comprises a third spherical lens located between the first spherical lens and the first aspheric lens, and the first spherical lens and the third spherical lens are together formed a first cemented lens.

18. The projection device as claimed in claim 17, wherein the first lens group further comprises a fourth spherical lens and a fifth spherical lens, and the fourth spherical lens and the fifth spherical lens are sequentially arranged between the third spherical lens and the first aspheric lens and together formed a second cemented lens.

19. The projection device as claimed in claim 18, wherein the first lens group further comprises a sixth spherical lens, a seventh spherical lens and an eighth spherical lens, wherein the sixth spherical lens, the seventh spherical lens and the eighth spherical lens are sequentially arranged between the fifth spherical lens and the first aspheric lens and together formed a third cemented lens.

20. The projection device as claimed in claim 19, wherein the first lens group further comprises a ninth spherical lens, a tenth spherical lens and an eleventh spherical lens, wherein the ninth spherical lens, the tenth spherical lens and the eleventh spherical lens are sequentially arranged between the eighth spherical lens and the first aspheric lens.

21. The projection device as claimed in claim 20, wherein refractive-powers of the first spherical lens, the third spherical lens, the fourth spherical lens, the fifth spherical lens, the sixth spherical lens, the seventh spherical lens, the eighth spherical lens, the ninth spherical lens, the tenth spherical lens, the eleventh spherical lens and the first aspheric lens are sequentially negative, positive, positive, negative, positive, negative, positive, negative, positive, positive and positive.

22. The projection device as claimed in claim 12, wherein the second aspheric lens is located between the planar reflector and the second spherical lens.

23. The projection device as claimed in claim 22, wherein the third aspheric lens and the fourth aspheric lens are sequentially arranged between the first lens group and the second spherical lens, and the twelfth spherical lens is disposed between the second spherical lens and the second aspheric lens.

24. The projection device as claimed in claim 14, wherein a position of the first lens group is fixed, and the second lens group is moveable along the optical axis relatively to the first lens group for focusing.

* * * * *